United States Patent
Kim et al.

(10) Patent No.: US 12,024,232 B2
(45) Date of Patent: Jul. 2, 2024

(54) VARIABLE VEHICLE FENDER GARNISH STRUCTURE AND CONTROL METHOD THEREOF

(71) Applicants: HYUNDAI MOTOR COMPANY, Seoul (KR); KIA CORPORATION, Seoul (KR)

(72) Inventors: Untae Kim, Gwangmyeong-si (KR); Junsik Shin, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 326 days.

(21) Appl. No.: 17/525,393

(22) Filed: Nov. 12, 2021

(65) Prior Publication Data
US 2022/0258809 A1    Aug. 18, 2022

(30) Foreign Application Priority Data
Feb. 18, 2021    (KR) .......................... 10-2021-0022150

(51) Int. Cl.
*B62D 25/18*    (2006.01)
*B62D 35/00*    (2006.01)

(52) U.S. Cl.
CPC ........... *B62D 25/182* (2013.01); *B62D 35/00* (2013.01); *B62D 35/008* (2013.01)

(58) Field of Classification Search
None
See application file for complete search history.

(56) References Cited

U.S. PATENT DOCUMENTS

| | | | | |
|---|---|---|---|---|
| 5,462,324 A | * | 10/1995 | Bowen | B62D 25/182 |
| | | | | 293/38 |
| 7,380,869 B2 | | 6/2008 | Nakaya | |
| 8,162,380 B2 | | 4/2012 | Sumitani et al. | |
| 11,014,615 B1 | * | 5/2021 | Ungetheim | B62D 25/02 |
| 2006/0096366 A1 | * | 5/2006 | Browne | B62D 35/005 |
| | | | | 73/170.11 |
| 2008/0100071 A1 | * | 5/2008 | Browne | B62D 25/182 |
| | | | | 292/341.17 |
| 2012/0091753 A1 | * | 4/2012 | Marlier | B62D 35/008 |
| | | | | 296/180.1 |

(Continued)

FOREIGN PATENT DOCUMENTS

| | | | | |
|---|---|---|---|---|
| DE | 102008046314 A1 | * | 6/2009 | ........... B62D 25/182 |
| DE | 102016203199 A1 | * | 8/2017 | |

(Continued)

OTHER PUBLICATIONS

Machine translation of DE 102008046314 A1 (Year: 2009).*
(Continued)

*Primary Examiner* — Kenneth M Dunne
(74) *Attorney, Agent, or Firm* — MCDONNELL BOEHNEN HULBERT & BERGHOFF LLP

(57) ABSTRACT

A variable fender garnish structure of a vehicle is provided and includes a fender garnish coupled to an outer edge part of a wheel guard of a vehicle and made with a shape covering a wheel of the vehicle, a flap member positioned in the rear part of the fender garnish and rotatably coupled to the fender garnish, a driving member rotating the flap member, and a controller driving the driving member to control whether the flap member is rotated or not.

8 Claims, 10 Drawing Sheets

(a) Closing all flaps    (b) Opening first flap    (c) Opening second flap    (d) Opening all flaps

(56) References Cited

U.S. PATENT DOCUMENTS

2017/0313364 A1\* 11/2017 Mason ................ B62D 25/182
2018/0251161 A1\* 9/2018 Wilson ................ B62D 25/182
2018/0354561 A1\* 12/2018 Jaeger .................... B62D 25/18
2019/0270486 A1\* 9/2019 Del Gaizo ............. B62D 37/02

FOREIGN PATENT DOCUMENTS

| DE | 102016204318 A1 \* | 9/2017 | ............. B62D 25/18 |
| DE | 102019104750 A1 \* | 9/2019 | ............. B62D 25/12 |
| FR | 2858793 A1 \* | 2/2005 | ............ B62D 35/008 |
| FR | 2896225 A1 \* | 7/2007 | ............. B62D 25/18 |
| GB | 2227985 A \* | 8/1990 | ........... B62D 25/168 |
| JP | H06227436 A \* | 8/1994 | ............. B52D 25/16 |
| KR | 10-2016-0058280 A | 5/2016 | |

OTHER PUBLICATIONS

Machine translation of JP H06227436 A (Year: 1994).\*
Machine translation of FR 2858793 A1 (Year: 2004).\*
Machine translation of FR 2896225 A1 (Year: 2007).\*
Machine translation of DE-102016203199-A1 (Year: 2017).\*
Machine translation of DE-102016204318-A1 (Year: 2017).\*
Machine Translation of DE-102019104750-A1 (Year: 2019).\*

\* cited by examiner

VARIABLE VEHICLE FENDER GARNISH STRUCTURE AND CONTROL METHOD THEREOF

CROSS-REFERENCE TO RELATED APPLICATION

This application claims priority to and the benefit of Korean Patent Application No. 10-2021-0022150 filed in the Korean Intellectual Property Office on Feb. 18, 2021, the entire contents of which are incorporated herein by reference.

BACKGROUND

(a) Field

The present disclosure relates to a variable fender garnish structure and a control method thereof. More particularly, the present disclosure relates to a variable fender garnish structure of a vehicle capable of minimizing a gap wake by adjusting an opening and a closing of a flap of a fender garnish according to a driving speed of a vehicle, and a control method thereof.

(b) Description of the Related Art

In the vehicle industry, fuel efficiency performance is becoming increasingly important as exhaust and environmental regulations are tightened. Research to reduce drag by applying aerodynamic design elements to improve fuel efficiency is being actively conducted. Additionally, recently, aerodynamic influence due to wheel/tire rotation at a high speed, which previously was an unknown area, is also being revealed.

In particular, as it is known that the gap between a wheel arch (a wheel guard) and a tire has a large contribution to vehicle drag, and studies to reduce the gap are continuing; however, it is also important to exhaust an eddy current generated by the tire inside the wheel house well, so it is difficult to unconditionally minimize the gap between the wheel arch and the tire.

The wheel arch shape is generally designed as round or quadrangular in consideration of design factors, and accordingly, a large difference in the aerodynamic performance occurs. If the shape of the wheel arch may be variably changed, it may be changed in a circular or quadrangle shape depending on the situation; however, usually, the fender is composed of a panel of a metal material and a garnish of a plastic material, so the shape is fixed, and once the shape is confirmed, the aerodynamic performance is dependently determined upon it, thereby limiting the performance.

Conventional methods exist of maximizing a damping effect by lengthening a bump stroke length at low speed by using a variable suspension and reducing the length of the suspension at high speed to vary the upper gap according to the situation, or applying a bendable structure to the front of the wheel guard and varying the front gap by air, as well as a method to change the front gap by applying an air guider of a sliding structure.

As described above, the conventional technology for adjusting the upper gap and the front gap between the wheel arch and the tire has been developed, but the technology for adjusting the rear gap is insignificant.

On the other hand, as shown in FIG. 1, as a result of evaluating the aerodynamic influence by dividing the fender garnish of the vehicle into 4 equal parts and reducing the gap between the wheel arch and the tire, there was an aerodynamic improvement effect of about 6 counts (a drag coefficient), and as a result of inducing an exhaust flow to this part by increasing the gap by removing a part C, it was confirmed that there was an aerodynamic improvement effect of about 3 counts. In general, when the gap between the wheel arch and the tire is reduced, the aerodynamics are improved, but in the case of the part C (the rear part of the garnish), it is advantageous to exhaust air and increase flow by increasing the gap.

The above information disclosed in this Background section is only for enhancement of understanding of the background of the disclosure, and therefore it may contain information that does not form the prior art that is already known in this country to a person of ordinary skill in the art.

SUMMARY

Therefore, according to an embodiment of the present disclosure, a variable fender garnish structure and a control method thereof, which may minimize a gap wake by forming a flap on a rear part of a fender garnish of a vehicle and adjusting opening and closing of the flap, are provided.

A variable fender garnish structure of a vehicle according to an embodiment of the present disclosure includes a fender garnish coupled to an outer edge part of a wheel guard of a vehicle and made with a shape covering a wheel of the vehicle, a flap member positioned in the rear part of the fender garnish and rotatably coupled to the fender garnish, a driving member rotating the flap member, and a controller driving the driving member to control whether the flap member is rotated or not.

The flap member may be hinged and coupled to the fender garnish.

The flap member may include a first flap disposed below the fender garnish and a second flap disposed side by side with the first flap and disposed above the fender garnish.

The driving member may include a drive motor and a driving actuator, the first flap may be rotated by the driving actuator, and the second flap may be rotated by the drive motor.

The driving actuator may include an actuator main body attached to the fender garnish and an actuator shaft protruded outwardly from the actuator main body to be rotated, the actuator shaft may be fitted and coupled into the coupling groove formed in the first flap, and the first flap may be rotated by the rotation of the actuator shaft.

The drive motor may include a motor main body attached to the fender garnish and a motor shaft gear protruded from the motor main body to the outside to be rotated, the motor shaft gear may be male/female-coupled to the joint gear formed in the second flap, and the second flap may be rotated by the rotation of the motor shaft gear.

The controller may determine whether the driving member is normal or malfunctioning, determine the speed of the vehicle if the driving member is determined to be normal, and drive the driving member depending on the speed of the vehicle to control whether the flap member is rotated.

The controller may control the driving member so that the first flap and the second flap do not rotate when the speed of the vehicle is less than a first speed.

The controller may control the driving member so that the first flap is rotated and the second flap is not rotated when the speed of the vehicle is greater than the first speed and less than a second speed greater than the first speed.

The controller may control the driving member so that the second flap is rotated and the first flap is not rotated when the speed of the vehicle is more than the second speed and less than a third speed greater than the second speed.

When the speed of the vehicle is above the third speed, the driving member may be controlled so that the first flap and the second flap are rotated.

On the other hand, a control method of a variable fender garnish structure of a vehicle according to an embodiment of the present disclosure includes determining whether the driving member is normal or malfunctioning after the vehicle starts, by the controller, determining the speed of the vehicle when it is determined that the driving member is normal, by the controller, and controlling whether the flap member is rotated by driving the driving member, by the controller, according to the speed of the vehicle.

The control method of the variable fender garnish structure of the vehicle according to an embodiment of the present disclosure may further include displaying a warning lamp on an instrument panel of the vehicle by the controller when it is determined that the driving member is abnormal.

When the speed of the vehicle is determined to be less than the first speed, the driving member may be controlled by the controller so that the first flap and the second flap are not rotated.

When the speed of the vehicle is determined to be greater than the first speed and less than a second speed greater than the first speed, the driving member may be controlled by the controller so that the first flap is rotated and the second flap is not rotated.

If the speed of the vehicle is determined to be more than the second speed and less than a third speed greater than the second speed, the driving member may be controlled by the controller so that the second flap is rotated and the first flap is not rotated.

When the speed of the vehicle is determined to be higher than the third speed, the driving member may be controlled by the controller so that the first flap and the second flap are rotated.

As such, according to the present disclosure, the gap wake may be minimized by installing the flap on the fender garnish of the vehicle and adjusting the opening and closing of the flap according to the driving speed of the vehicle, and an optimal aerodynamic (lift/drag) improvement effect may be obtained.

DETAILED DESCRIPTION

Figure 1:
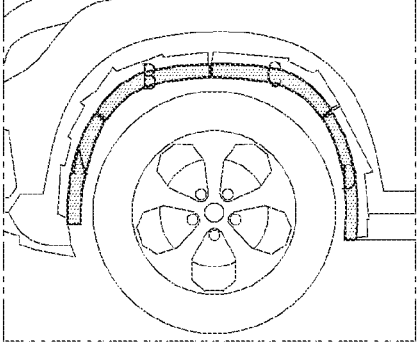
FIG. 1 is a view showing a result of evaluating an aerodynamic influence by reducing a gap between a wheel guard and a tire of a vehicle.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present invention.

Further, in embodiments, since like reference numerals designate like elements having the same configuration, a first embodiment is representatively described, and in other embodiments, only different configurations from the first embodiment will be described.

The drawings are schematic and are not illustrated in accordance with a scale. The relative sizes and ratios of the parts in the drawings are exaggerated or reduced for clarity and convenience in the drawings, and the arbitrary sizes are only examples, and are not limiting. The same structures, elements, or parts illustrated in no less than two drawings are denoted by the same reference numerals in order to represent similar characteristics. When a part is referred to as being "on" another part, it can be directly on the other part or intervening parts may also be present.

Embodiments of the present disclosure specifically show one embodiment of the present disclosure. As a result, various modifications of the drawings are anticipated. Accordingly, the embodiments are not limited to certain forms of the regions illustrated, but may include forms that are modified through manufacturing, for example.

Hereinafter, a variable fender garnish structure of a vehicle according to an embodiment of the present disclosure will be described in detail with reference to accompanying drawings.

Figure 2:
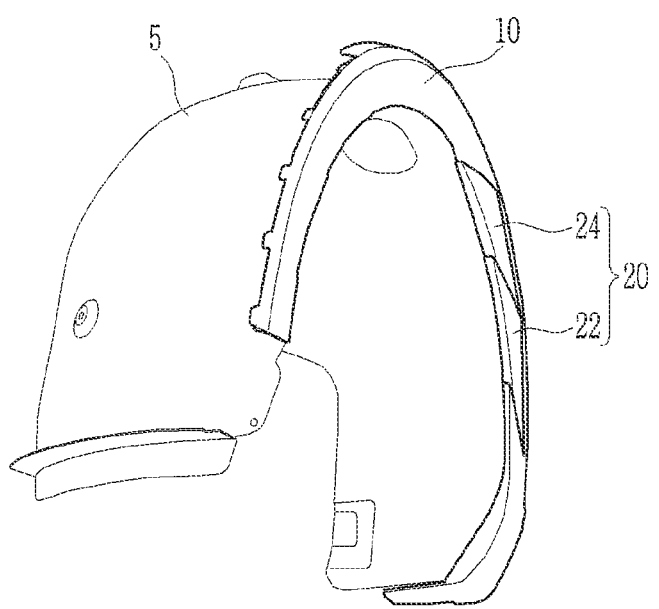
FIG. 2 is a view showing a state in which a variable fender garnish structure of a vehicle according to an embodiment of the present disclosure is installed to a wheel guard.
Figure 3:
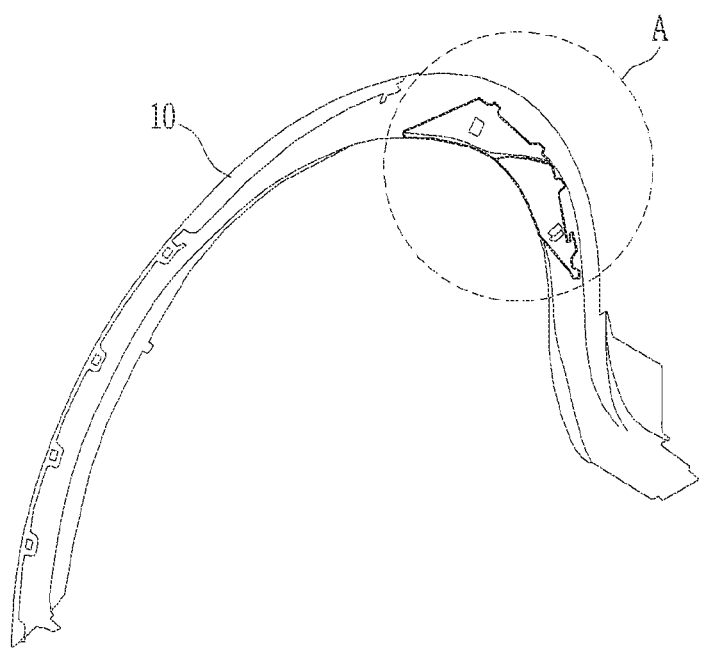
FIG. 3 is a view showing a variable fender garnish structure of a vehicle according to an embodiment of the present disclosure.
Figure 4:
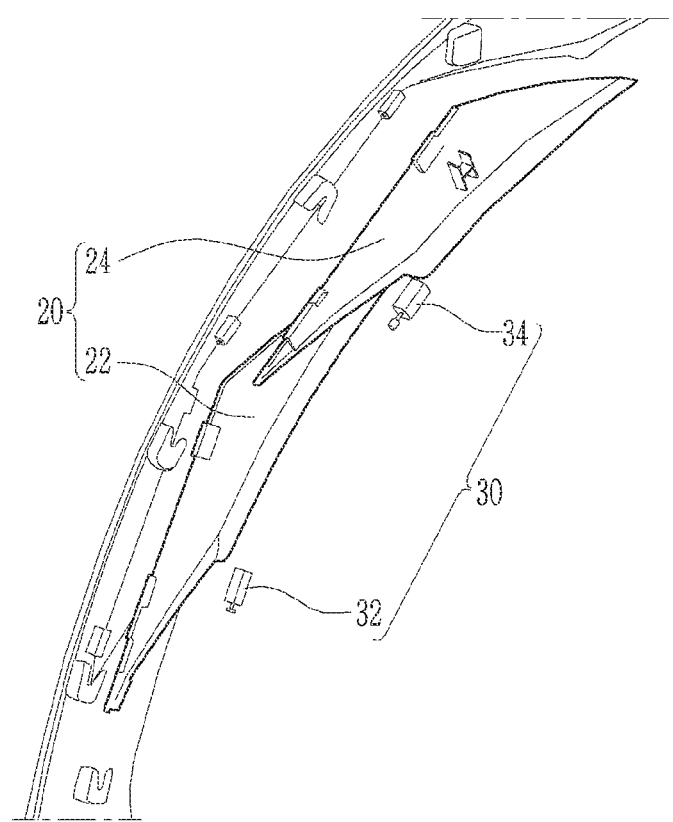
FIG. 4 is an exploded view enlarging and showing a part 'A' of FIG. 3.

FIG. 2 is a view showing a state in which a variable fender garnish structure of a vehicle according to an embodiment of the present disclosure is installed to a wheel guard, FIG. 3 is a view showing a variable fender garnish structure of a vehicle according to an embodiment of the present disclosure, and FIG. 4 is an exploded view enlarging and showing a part 'A' of FIG. 3.

Referring to FIG. 2 through FIG. 4, the fender garnish 10 of the vehicle according to an embodiment of the present disclosure is coupled to the outer edge part of a wheel guard 5 of the vehicle, and is formed with a shape covering the wheel of the vehicle along with the wheel guard 5.

The rear part of the fender garnish 10 is equipped with a flap member 20. The flap member 20 is provided on the rear part of the fender garnish 10, that is, on the rear side of the vehicle, and is hinged and coupled so that it may be opened and closed by a rotation. The flap member 20 includes a first flap 22 and a second flap 24, the first flap 22 being positioned below the fender garnish 10, and the second flap 24 being disposed in parallel above and below the first flap 22 and positioned above the fender garnish 10.

When the flap member 20 is not opened and closed, the surface of the flap member 20 naturally coincides with the surface of the fender garnish 10, so that the gap between the wheel guard 5 and the tire is uniform in the entire area of the fender garnish 10. However, when the flap member 20 is rotated and opened, the gap between the wheel guard 5 and the tire increases only in the opened first flap 22 and second flap 24 parts and the flow exhaust may be induced to this area. Therefore, an additional aerodynamic improvement effect may be expected by increasing the rear gap of a specific region.

The flap member 20 may be rotated by the driving member 30. According to an embodiment of the present disclosure, the first flap 22 may be rotated by the driving actuator 32 and the second flap 24 may be rotated by the drive motor 34. Although not illustrated, the present disclosure is not limited thereto, and it may be configured such that the first flap 22 is rotated by the drive motor 34 and the second flap 24 is rotated by the driving actuator 32. It is also possible to configure both the first and second flaps 22 and 24 to be rotated by the drive motor 34, or both, by the driving actuator 32.

The driving actuator 32 and the drive motor 34 may be operated by a controller. The controller may control whether the first flap 22 and the second flap 24 rotates (opens or closes) by applying a control signal to the driving actuator 32 and the drive motor 34, respectively.

Figure 5:
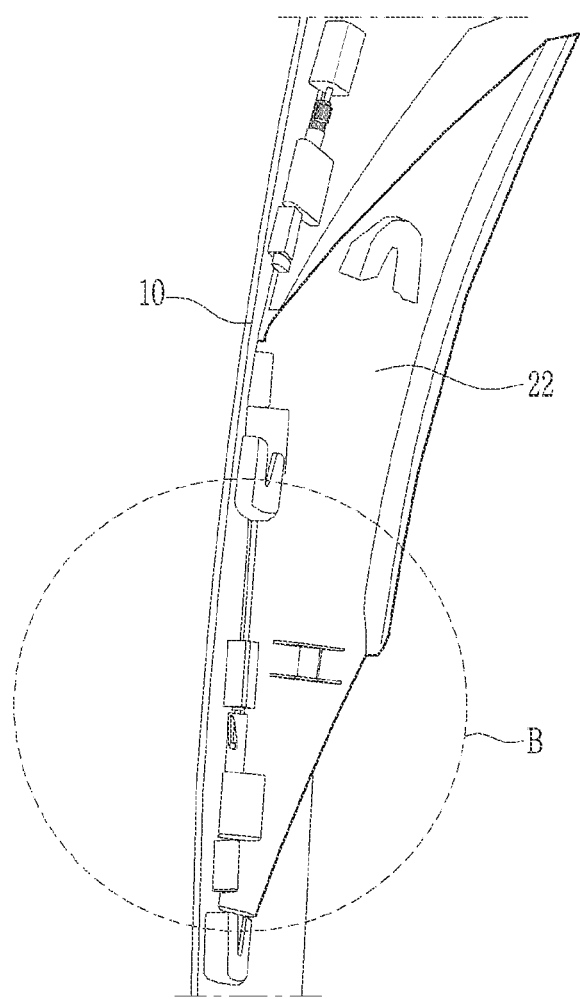
FIG. 5 is a view showing a first flap of a flap member in a variable fender garnish structure of a vehicle according to an embodiment of the present disclosure.
Figure 6:
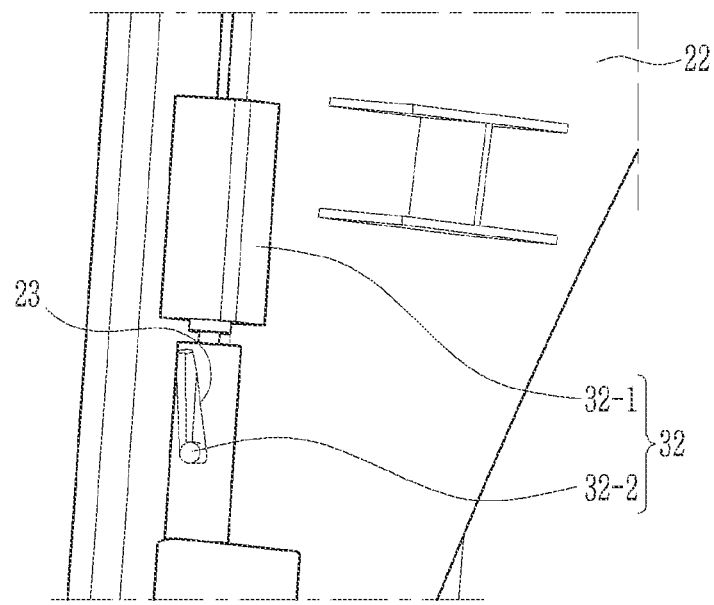
FIG. 6 is an enlarged view of a part 'B' of FIG. 5.

FIG. 5 is a view showing a first flap of a flap member in a variable fender garnish structure of a vehicle according to an embodiment of the present disclosure, and FIG. 6 is an enlarged view of a part 'B' of FIG. 5.

Referring to FIG. 5 and FIG. 6, the first flap 22 may be provided on the lower side of the fender garnish 10 and may be rotated by the driving actuator 32. The driving actuator 32 may be mounted on the fender garnish 10.

The driving actuator 32 may include an actuator main body 32-1 attached to the fender garnish 10 and an actuator shaft 32-2 protruded outwardly from the actuator main body 32-1 to be rotated. In addition, the coupling groove 23 is integrally formed with the first flap 22 at the position corresponding to the actuator shaft 32-2 on the first flap 22, so that the actuator shaft 32-2 may be fitted and coupled into the coupling groove 23. The actuator shaft 32-2 is coupled to the coupling groove 23 so that they may be rotated together without sliding with each other. As the actuator shaft 32-2 rotates, the first flap 22 may also rotate. The rotation angle of the driving actuator 32 may be adjusted by the controller.

Figure 7:
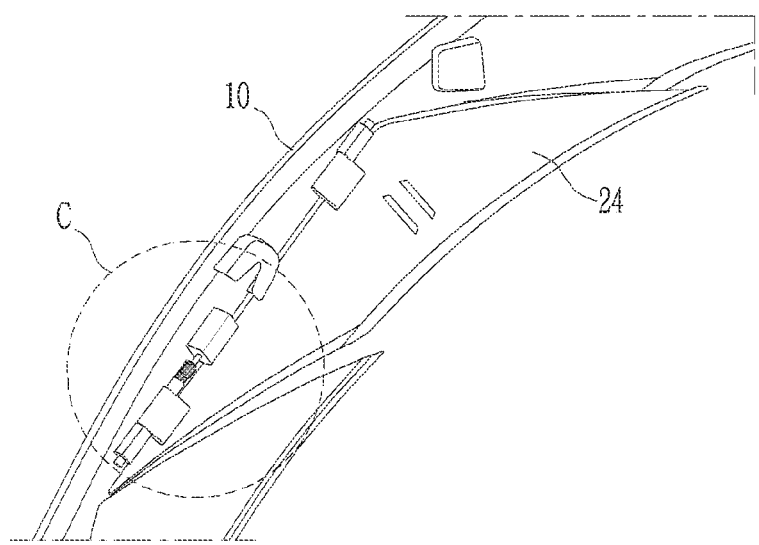
FIG. 7 is a view showing a second flap of a flap member in a variable fender garnish structure of a vehicle according to an embodiment of the present disclosure.
Figure 8:
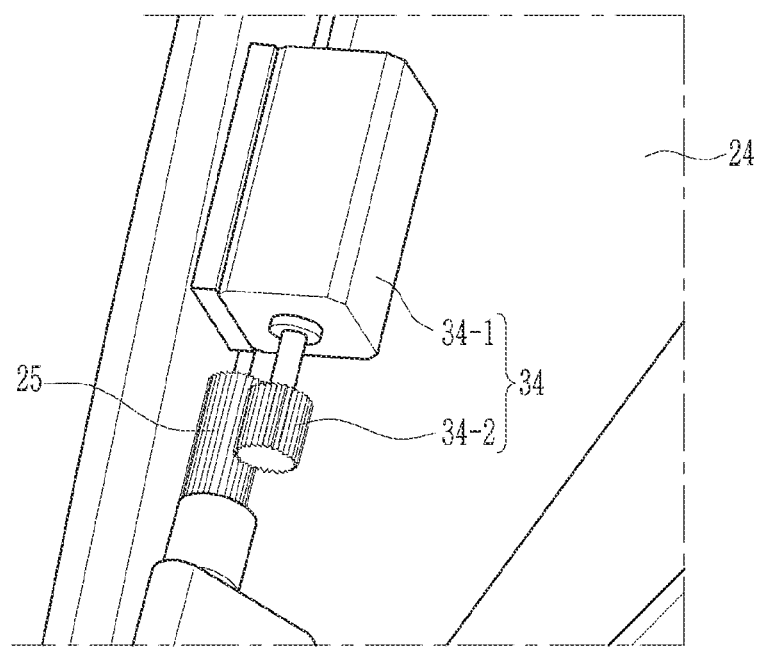
FIG. 8 is an enlarged view of a part 'C' of FIG. 7.

FIG. 7 is a view showing a second flap of a flap member in a variable fender garnish structure of a vehicle according to an embodiment of the present disclosure, and FIG. 8 is an enlarged view of a part 'C' of FIG. 7.

Referring to FIG. 7 and FIG. 8, the second flap 24 may be provided on an upper part of the fender garnish 10, and may be disposed side by side up and down with the first flap 22. Also, the second flap 24 may be configured to have a larger area than the first flap 22. The second flap 24 may be rotated by the drive motor 34, and the drive motor 34 may be mounted on the fender garnish 10.

The drive motor 34 may include a motor main body 34-1 and a motor shaft gear 34-2 protruded outside from the motor main body 34-1 to be rotated. Also, on the second flap 24, a joint gear 25 in a position corresponding to the motor shaft gear 34-2 may be integrally formed on the second flap 24. The motor shaft gear 34-2 is male/female-coupled to the joint gear 25, and the second flap 24 may be rotated by the rotation of the motor shaft gear 34-2. The drive motor 34 may adjust the rotation angle by the controller.

The controller determines whether the driving member 30 is normal or abnormal, and when it is determined that the driving member 30 is normal, after determining the vehicle speed, the controller drives the driving member 30 according to the speed of the vehicle to control the rotation of the flap member 20. At this time, the controller may be implemented as at least one processor operating according to a predetermined program, and the predetermined program may be programmed to perform each step of the control method of the variable fender garnish structure of the vehicle according to an embodiment of the present disclosure.

Figure 9:
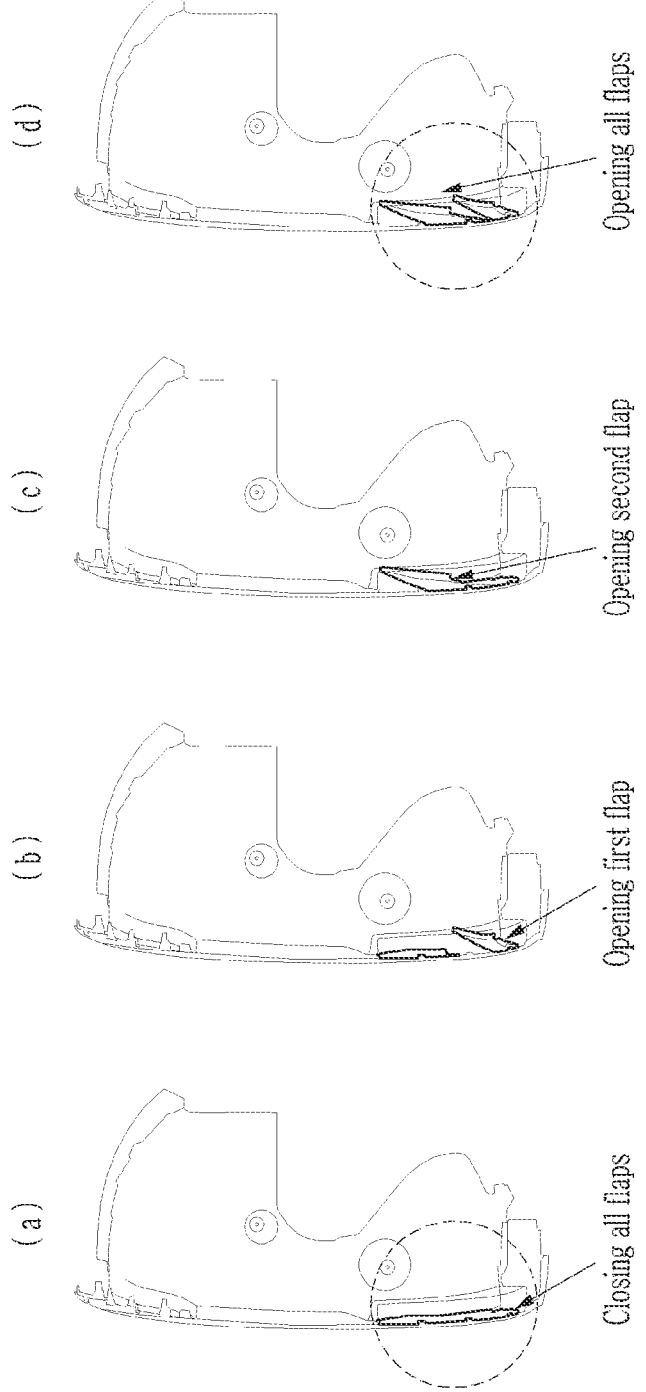
FIG. 9 is a view showing a state in which a controller of a variable fender garnish structure of a vehicle controls whether a flap member is rotated depending on a vehicle speed according to an embodiment of the present disclosure.

FIG. 9 is a view showing a state in which a controller of a variable fender garnish structure of a vehicle controls whether a flap member is rotated depending on a vehicle speed according to an embodiment of the present disclosure.

Referring to FIG. 9, by the controller, if the driving member 30 is normal and the speed of the vehicle is about 30 kph (km/h) or less in a slow speed state, the driving actuator 32 and the drive motor 34 are controlled so that the first flap 22 and the second flap 24 do not rotate (a). In addition, when the vehicle speed is a low speed of about 30 kph or more and less than about 60 kph, the controller controls the driving actuator 32 to rotate the first flap 22 and the drive motor 34 to prevent the second flap 24 from rotating (b). In addition, when the speed of the vehicle is a medium speed of about 60 kph or more and less than about 120 kph, the controller controls the drive motor 34 to rotate the second flap 24 and the driving actuator 32 to prevent the first flap 22 from rotating (c). In addition, when the speed of the vehicle is a high speed of about more than 120 kph, the driving actuator 32 and the drive motor 34 are controlled by the controller so that the first flap 22 and the second flap 24 are rotated (d).

Figure 10:
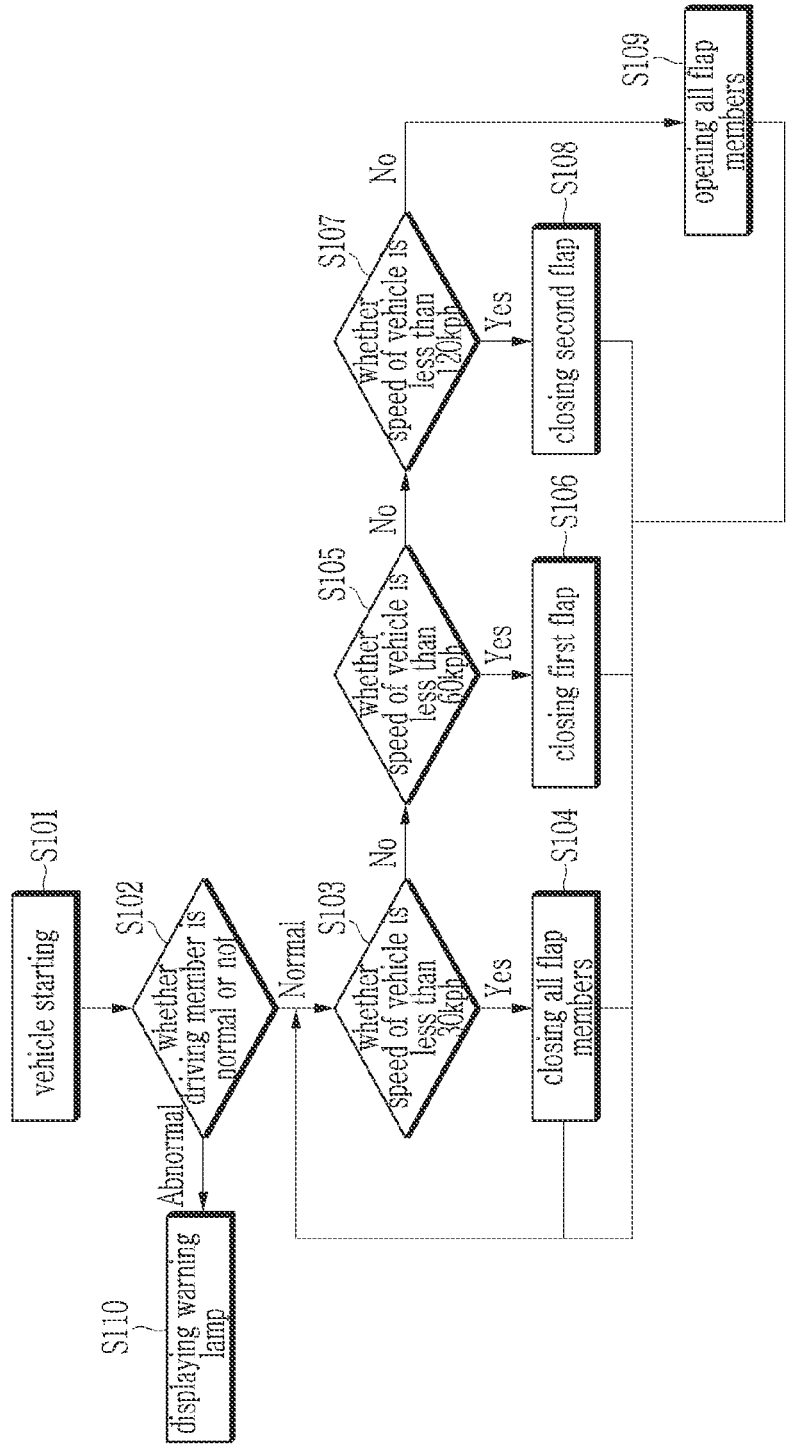
FIG. 10 is a flowchart showing a control method of a variable fender garnish structure of a vehicle according to an embodiment of the present disclosure.

FIG. 10 is a flowchart showing a control method of a variable fender garnish structure of a vehicle according to an embodiment of the present disclosure.

Referring to FIG. 10, in the control method of the variable fender garnish structure of the vehicle according to an embodiment of the present disclosure, in a state that the starting of the vehicle is ON (S101), the controller determines whether the driving member is normal or abnormal (S102). If the driving member is judged to be defective, a warning lamp is displayed on an instrument panel of the vehicle by the controller (S110).

When it is determined that the driving member is normal, the speed of the vehicle is determined by the controller (S103, S105, and S107). Then, according to the speed of the vehicle, the controller drives the driving member to control the rotation of the flap member.

At this time, if it is determined that the speed of the vehicle is less than about 30 kph (S103), the controller controls the driving member so that the first flap and the second flap do not rotate (S104). In addition, when it is determined that the speed of the vehicle is greater than or equal to about 30 kph and less than about 60 kph (S105), the controller controls the driving member so that the first flap is rotated and the second flap is not rotated (S106). In addition, if it is determined that the speed of the vehicle is greater than or equal to about 60 kph and less than about 120 kph (S107), the controller controls the driving member so that the second flap is rotated and the first flap is not rotated (S108). In addition, if it is determined that the speed of the vehicle is greater than or equal to about 120 kph, the controller controls the driving member so that the first flap and the second flap are rotated (S109).

The controller may also control the rotation angle of the first flap and the second flap. In addition, the controller may continuously determine the speed of the vehicle during the driving and control the driving member as described above according to the speed of the vehicle.

As such, according to the present disclosure, the gap wake may be minimized by installing the flap on the fender garnish of the vehicle and adjusting the opening and closing of the flap according to the driving speed of the vehicle, and an optimal aerodynamic (lift/drag) improvement effect may be obtained.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A variable fender garnish structure of a vehicle, comprising:
    a fender garnish coupled to an outer edge part of a wheel guard of a vehicle and extending along a wheel of the vehicle;
    a flap member positioned in the rear part of the fender garnish and rotatably coupled to the fender garnish;
    a driving member rotating the flap member; and
    a controller driving the driving member to control whether the flap member is rotated in a deployed position or not rotated so as to block flow;
    wherein the controller determines whether the driving member is normal or malfunctioning and, if the driving member is determined to be normal, the controller determines the speed of the vehicle and drives the driving member based on the speed of the vehicle to control whether the flap member is rotated,
    wherein the controller controls the driving member so that a first flap and a second flap that is larger than the first flap do not rotate when the speed of the vehicle is less than a first speed,
    wherein the controller controls the driving member so that the first flap is rotated and the second flap is not rotated when the speed of the vehicle is greater than the first speed and less than a second speed,
    wherein the controller controls the driving member so that the second flap is rotated and the first flap is not rotated when the speed of the vehicle is more than the second speed and less than a third speed,
    wherein when the speed of the vehicle is above the third speed, the driving member is controlled so that the first flap and the second flap are rotated.

2. The variable fender garnish structure of the vehicle of claim 1, wherein:
    the flap member is hinged and coupled to the fender garnish.

3. The variable fender garnish structure of the vehicle of claim 1, wherein:
    the flap member includes a first flap disposed below the fender garnish and a second flap disposed in parallel with the first flap and disposed above the fender garnish.

4. The variable fender garnish structure of the vehicle of claim 2, wherein:
    the driving member includes a drive motor and a driving actuator,
    the first flap is rotated by the driving actuator, and
    the second flap is rotated by the drive motor.

5. The variable fender garnish structure of the vehicle of claim 4, wherein:
    the driving actuator includes an actuator main body attached to the fender garnish and an actuator shaft protruded outwardly from the actuator main body to be rotated,
    the actuator shaft is fitted and coupled into the coupling groove formed in the first flap, and
    the first flap is rotated by the rotation of the actuator shaft.

6. The variable fender garnish structure of the vehicle of claim 4, wherein:
    the drive motor includes a motor main body attached to the fender garnish and a motor shaft gear protruded from the motor main body to the outside to be rotated,
    the motor shaft gear is male/female-coupled to the joint gear formed in the second flap, and
    the second flap is rotated by the rotation of the motor shaft gear.

7. A control method of a variable fender garnish structure of a vehicle of claim 1, comprising:
    determining whether the driving member is normal or malfunctioning after the vehicle starts, by the controller;
    determining the speed of the vehicle when it is determined that the driving member is normal, by the controller; and
    controlling whether the flap member is rotated by driving the driving member, by the controller, according to the speed of the vehicle;
    wherein when the speed of the vehicle is determined to be less than the first speed, the driving member is controlled by the controller so that a first flap and a second flap that is configured to comprise a larger area than the first flap are not rotated;
    wherein when the speed of the vehicle is determined to be greater than the first speed and less than a second speed greater than the first speed, the driving member is controlled by the controller so that the first flap is rotated and the second flap is not rotated;
    wherein if the speed of the vehicle is determined to be more than the second speed and less than a third speed greater than the second speed, the driving member is controlled by the controller so that the second flap is rotated and the first flap is not rotated;
    wherein when the speed of the vehicle is determined to be higher than the third speed, the driving member is controlled by the controller so that the first flap and the second flap are rotated.

8. The control method of the variable fender garnish structure of the vehicle of claim 7, further comprising:
    displaying a warning lamp on an instrument panel of the vehicle by the controller when it is determined that the driving member is abnormal.

* * * * *